(12) United States Patent
Li

(10) Patent No.: US 6,466,173 B1
(45) Date of Patent: Oct. 15, 2002

(54) ANTENNA ASSEMBLY, AND ASSOCIATED METHOD, HAVING PLURAL ANTENNA TRANSDUCERS SELECTABLY CONNECTABLE TO RADIO CIRCUITRY OF A RADIO DEVICE

(75) Inventor: Kevin Li, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/653,477

(22) Filed: Sep. 1, 2000

(51) Int. Cl.[7] ................................. H01Q 1/24
(52) U.S. Cl. ....................... 343/702; 343/725
(58) Field of Search .................. 343/702, 700 MS, 343/725, 727, 729

(56) References Cited

U.S. PATENT DOCUMENTS

| | | | |
|---|---|---|---|
| 3,087,117 A | * 4/1963 | Mitchell | 343/702 |
| 4,862,182 A | * 8/1989 | Egashira | 343/702 |
| 5,594,457 A | * 1/1997 | Wingo | 343/702 |
| 5,905,467 A | * 5/1999 | Narayanaswamy et al. | 343/702 |
| 6,064,863 A | * 5/2000 | Matai | 343/702 |
| 6,097,342 A | * 8/2000 | Engblom | 343/702 |
| 6,198,441 B1 | * 3/2001 | Okabe et al. | 343/702 |

FOREIGN PATENT DOCUMENTS

| | | | |
|---|---|---|---|
| EP | 0 961 343 | 12/1999 | H01Q/1/24 |
| JP | 07030956 | 1/1995 | H04Q/7/32 |
| WO | WO 00/36700 | 6/2000 | H01Q/1/24 |

* cited by examiner

*Primary Examiner*—Hoanganh Le
(74) *Attorney, Agent, or Firm*—Milan I. Patel

(57) ABSTRACT

An antenna assembly, and an associated method, for a portable radio device, such as a mobile station. The antenna assembly includes a whip antenna transducer capable of translation between a retracted position and an extracted position. When positioned in the extracted position, a switch element interconnects the whip antenna transducer together with radio circuitry of the radio device. When positioned in a retracted position, the switch element, instead, connects the radio circuitry of the radio device to a non-movable antenna transducer, such as a patch or PIFA antenna transducer, housed within the housing of the radio device.

13 Claims, 7 Drawing Sheets

ANTENNA ASSEMBLY, AND ASSOCIATED METHOD, HAVING PLURAL ANTENNA TRANSDUCERS SELECTABLY CONNECTABLE TO RADIO CIRCUITRY OF A RADIO DEVICE

The present invention relates generally to a manner by which to transduce communication signals at a radio device, such as a mobile station, operable in a radio communication system. More particularly, the present invention relates to an antenna assembly, and an associated method, by which a selected one of at least two antenna transducers is selectably connected to radio circuitry of the radio device. The antenna assembly includes a switch element which is compact, reliable, inexpensive and exhibits low-loss characteristics, all significant criteria in the construction of a mobile station, or other radio device.

BACKGROUND OF THE INVENTION

Implementation, and widespread usage, of multi-user radio communication systems has been permitted as a result of advancements in communication technologies. Similar to other types of communication systems, a radio communication system permits the communication of data between a sending station and a receiving station, by way of a communication channel. In a radio communication system, the communication channel forms a radio channel, defined upon a radio link formed between the sending and receiving stations. The radio channel defined upon the radio link is characterized by selected frequencies of the electromagnetic spectrum. Regulatory bodies allocate portions of the electromagnetic spectrum for communications in various communication systems.

To convert the data which is to be communicated into a form to permit its communication upon a communication channel defined in a radio communication system, a sending station, forming a transmitter, modulates an information signal containing the data upon a carrier wave of a carrier frequency within the range of frequencies which characterizes, at least in part, the communication channel. Through the modulation process, a base bandlevel signal of which the information signal is formed is converted into a radio frequency signal of desired frequency characteristics.

A transmitter, operable to transmit radio frequency signals upon a radio channel, typically includes one or more up-mixing stages at which the base band information signal is up-converted in frequency to be of the selected radio frequency. The mixing stages include mixer circuits coupled to receive the information signal and an up-mixing signal with which the information signal is to be multiplied, or otherwise combined, to form an up-converted signal. When multiple mixing stages are utilized, an IF (intermediate frequency) signal is formed at a first, or first series of, mixer stages. A radio frequency signal is formed at the final mixing stage.

A receiver, formed of the receiving station, which receives a radio frequency communication signal transmitted thereto upon a radio communication channel must, analogously convert the radio frequency signal to a base band level. One or more down-conversion stages is utilized to down-convert the radio frequency signal to a base band level.

Both the transmitter and the receiver include, typically, an antenna transducer. The antenna transducer, when coupled to a transmitter to form a portion thereof, transduces the radio frequency signal generated at the transmitter out of electrical form and into electromagnetic form for transmission upon the radio channel. The antenna transducer, when coupled to a receiver to form a portion thereof, conversely, transduces radio frequency signals out of electromagnetic form and into electrical form, t hereafter to permit processing by the circuitry of the receiver of the received signals.

A radio transceiver, having both a transmitter and a receiver to permit two-way communications, sometimes utilizes an antenna transducer which is shared by both the receiver and transmitter portions of the transceiver. A filter duplexer is sometimes utilized if the radio transceiver is operable pursuant to a frequency division multiplexing scheme having separate transmit and receive pass bands.

Various different types of antenna transducer constructions are utilized to form portions of a radio device. A mobile station, exemplary of a radio device, sometimes includes a whip antenna, a PIFA (Planer Inverted F Antenna), or a patch antenna. Such antenna transducers are generally, in some manner, of dimensions related to wave lengths of communication signals which are to be transduced by the antenna transducer. Mobile stations operable in a cellular communication system, for instance, are generally operable at frequencies located in the upper hundreds of megahertz (e.g., 800 MHz) and in the gigahertz (e.g., 1.8 GHz) range. One quarter wave length and other fractionally wave length-related antenna lengths are commonly utilized.

Conventional whip antenna transducers oftentimes are constructed to be translatable, either to be positioned within a housing which houses radio circuitry of the radio device, or translated to extend beyond the housing of the radio device. And, patch antenna transducers, as well as PIFA antenna transducers, are sometimes positioned within the housing of the radio device.

Some mobile stations, as well as other radio devices, include more than one antenna transducer alternately connectable to the radio circuitry. For instance, efforts are sometimes made to include both a whip antenna transducer and a patch, or PIFA, antenna transducer at a mobile station. An appropriate switching mechanism, however, is required to switch between the antenna transducers. Existing mechanisms are generally complex, large, expensive, and exhibit loss, all undesirable characteristics.

If an improved manner could be provided by which to better switchably connect more than one antenna transducer to the radio circuitry of a radio device, such as a mobile station, an improved radio device would be possible.

It is in light of this background information related to antenna transducers that the significant improvements of the present invention have evolved.

SUMMARY OF THE INVENTION

The foregoing and other features, utilities, and advantages of the invention will be apparent from the following more particular description of a preferred embodiment of the invention as illustrated in the accompanying drawings.

The present invention, accordingly, provides an antenna assembly, and an associated method, by which to transduce communication signals at a radio device, such as a mobile station, operable in a radio communication system.

Through operation of an embodiment of the present invention, a manner is provided by which a selected one of at least two antenna transducers is selectably coupled to radio circuitry of the mobile station, or other radio device.

In one aspect of the present invention, a switch element is provided for an antenna assembly which includes at least two antenna transducers. The switch element is compact, reliable, inexpensive, and exhibits low-loss characteristics. The antenna assembly including such a switch element advantageously forms a portion of a cellular mobile station, or other radio communication device, which is packaged in a housing of compact dimensions.

In another aspect of the present invention, an antenna assembly is provided which includes a whip antenna transducer, capable of sliding translation between a retracted position and a extracted position. When positioned in the retracted position, the antenna transducer is substantially entirely positioned within a housing which further houses the radio circuitry of the radio device. When translated into the extracted position, such as through application of a translation force upon the whip antenna transducer by user of the mobile station, the antenna transducer extends beyond the radio housing. Translation of the whip antenna transducer alternately connects or disconnects, the antenna transducer into, and out of, connection with radio circuitry of the mobile station. When positioned in the extracted position, the whip antenna transducer is switchably connected to the radio circuitry, and, when translated out of the extracted position, the antenna transducer is disconnected out of connection with the radio circuitry.

In another aspect of the present invention, an antenna assembly is provided which includes a non-movable antenna transducer, such as a PIFA (planer inverted F antenna) or patch antenna transducer. The non-movable antenna transducer is switchably connectable to radio circuitry of a radio device, such as a mobile station. Once connected to the radio circuitry, the non-movable antenna transducer transduces communication signals between the electromagnetic and electrical form. When the antenna assembly also includes a whip antenna transducer, connection of the non-movable antenna transducer to the radio circuitry is dependent upon the positioning of the whip antenna transducer, e.g., whether the whip antenna transducer is positioned in an extracted position or an other-than-extracted position. When, for instance, the whip antenna transducer is positioned in an extracted position in which the whip antenna transducer extends beyond a housing at which the radio circuitry is housed, the non-movable antenna transducer is disconnected out of connection with the radio circuitry. Conversely, when the whip antenna transducer is positioned in a retracted position, the non-movable antenna transducer is, instead, connected to the radio circuitry.

In another aspect of the present invention, a switch element is provided for the antenna assembly. The switch element alternately connects one of at least two antenna transducers to radio circuitry. The switch position of the switch element is dependent upon a translation position of a translatable whip antenna transducer which forms a portion of the antenna assembly. Translation of the whip antenna transducer causes linear movement of the switch element, alternately to cause the switch element to connect the whip antenna transducer with the radio circuitry and to connect the non-movable antenna transducer with the radio circuitry.

In another aspect of the present invention, the switch element which switchably connects either the whip antenna transducer or the non-movable antenna transducer with the radio circuitry is permitted rotational movement either to connect the whip antenna transducer or the non-movable antenna transducer with the radio circuitry. Translation of the whip antenna transducer induces rotational movement of the switch element, thereby to cause positioning of the switch element alternately to connect the whip antenna transducer and the non-movable antenna transducer to the radio circuitry.

In these and other aspects, therefore, an antenna assembly, and an associated method, is provided for a radio device having radio circuitry. A first antenna transducer is selectably connectable to the radio circuitry. A second antenna transducer is also selectably connectable to the ratio circuitry. The second antenna transducer is translatable between a retracted position and an extracted position. A switch element is switchably connectable between the radio circuitry and the first antenna transducer and between the radio circuitry and the second antenna transducer. The switch element is connected between the radio circuitry and the second antenna transducer when the second antenna transducer is positioned in the extended position and connected between the radio circuitry and the first antenna transducer as the second antenna transducer is translated out of the extracted position and into the retracted position.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PREFERRED EMBODIMENT

Figure 1:
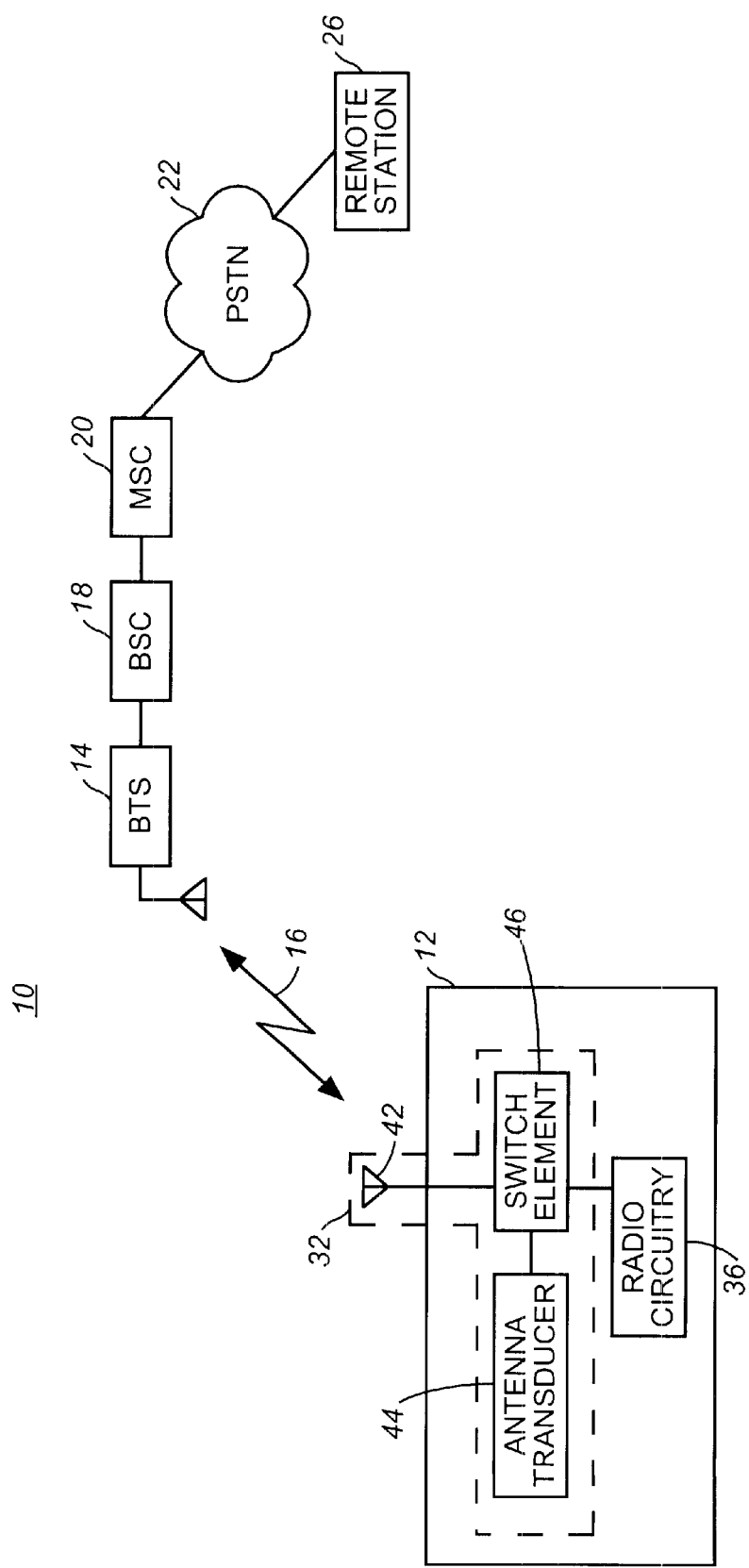
FIG. 1 illustrates a functional block diagram of a communication system in which an embodiment of the present invention is operable.

Referring first to FIG. 1, a communication system, shown generally at 10, provides for radio communications between a mobile station 12 and network infrastructure of the communication system. While the Figure illustrates only a single mobile station 12, the communication system, in the exemplary implementation, forms a multi-user communication system in which the mobile station 12 is representative of any selected mobile station operable therein.

In the exemplary implementation, the communication system 10 forms a cellular communication system which permits a user of a mobile station, such as the mobile station 12, to subscribe pursuant to a subscription with an operator of the communication system. Pursuant to the service subscription, the user of the mobile station is permitted to communicate by way of the mobile station with a remote communication station coupled to the network infrastructure of the communication system.

The network infrastructure of the communication system is here shown to include a Base Transceiver Station (BTS) 14 operable to transceive communication signals with the mobile station by way of a radio link 16 formed therebetween. The base transceiver station is, in turn, coupled to a Base Station Controller (BSC) 18. The base station controller is operable, amongst other things, to control operation of the base transceiver station. And, in turn, the base station controller is coupled to a Mobile Switching Center (MSC) 20.

The mobile switching center 20 is connected by way of an external network, here a Public-Switched Telephonic Network (PSTN) 22 with a remote communication station 26. A communication path is formable between the communication station 26 and the mobile station 12 by way of the PSTN, the network infrastructure of the communication, and the radio link 16 formed between the mobile station and the base transceiver station 14. Communication is effectuable upon the communication path formed therebetween.

When the communication system forms a cellular communication system, the mobile station is capable of two-way communication by way of the radio link 16. Forward link signals, generated at the network infrastructure are transduced into electromagnetic form and communicated upon a forward link of the radio link 16 to the mobile station 12 and, conversely, reverse link signals generated at the mobile station are transduced into electromagnetic form and communicated upon a forward link of the radio link 16 to the network infrastructure.

The mobile station includes an antenna assembly 32 of an embodiment of the present invention to transduce communication signals in, and out of, electromagnetic form. Forward link signals transmitted to the mobile station 12 are transduced into electrical form to permit subsequent processing thereof by radio circuitry 36 of the mobile station. Reverse link signals generated at the mobile station to be communicated upon the reverse link of the radio link 16 are provided to the antenna assembly, thereat to be transduced into electromagnetic form for communication upon the reverse link of the radio link 16. And, send signals generated at the network infrastructure and communicated upon a forward link of the radio link 16 are transduced at the antenna transducer into electrical form, thereafter to be provided to the radio circuitry 36.

The antenna assembly 32 includes a first antenna transducer 42 and a second antenna transducer 44 which are selectably connected to the radio circuitry by way of a switch element 46. The antenna transducer 42 forms a whip antenna transducer capable of translation between a retracted position and an extracted position. And, the antenna transducer 44 forms a nonmovable antenna transducer, such as a patch antenna transducer or a PIFA (planer inverted F antenna). The switch element 46 connects one, or the other, of the antenna transducers 42 and 44 to the radio circuitry. When a selected one of the antenna transducers is connected, by way of the switch element, with the radio circuitry, the selected antenna transducer transduces, into, and out of, electromagnetic form communication signals to be received at, or transmitted by, the radio circuitry. The antenna transducer not connected by way of the switch element to the radio circuitry is not operable, when disconnected from the radio circuitry, to transduce communication signals.

In the exemplary implementation of the present invention in which the antenna transducer 42 forms a whip antenna transducer, translation of the antenna transducer between a retracted and an extracted position is determinative of the switch position of the switch element. When the antenna ransducer 42 is positioned in the extracted position, the switch element connects the whip antenna transducer together with the radio circuitry. When the whip antenna transducer is translated out of the extracted position, the switch element disconnects the whip antenna transducer out of the connection with the radio circuitry and, instead, connects the non-movable antenna transducer together with the radio circuitry.

Figure 2:
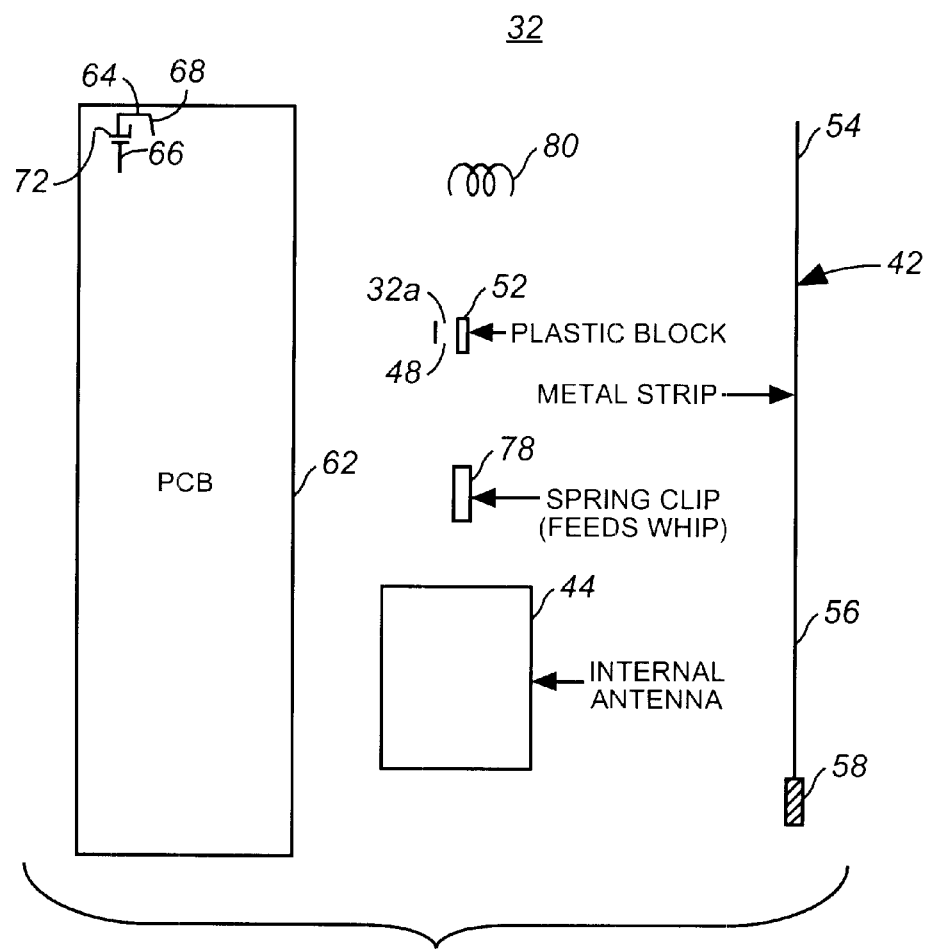
FIG. 2 illustrates an exploded, functional-block view of an antenna assembly of an embodiment of the present invention which forms a portion of the mobile station of the communication system shown in FIG. 1.

The antenna assembly 32 is shown in exploded form in FIG. 2. The assembly 32 is again shown to include the antenna transducers 42 and 44 as well as also switch element 46, here formed of a plastic block 48 upon which a metal strip 52 is mounted.

The whip antenna transducer is formed of an elongated, conductive member having a distal side portion 54 and a proximal side portion 56. Positioned at an end of the proximal side portion 56 is a stopper 58 formed of an electrically-conductive material.

A Printed Circuit Board (PCB) 62 is further shown in the Figure. The circuit board includes a face surface upon which electrical traces 64 are printed. The traces are formed to include an RF (Radio Frequency) input port 66, a pad 68 for connection of the internal antenna 44 thereat, and a pad 72 permitting connection of the whip antenna transducer 56 thereat. Matching components 74, forming, for instance, inductors and capacitors, are also formed of the traces.

The antenna assembly also includes a spring 80 which provides a spring biasing force to bias positioning of the plastic block 48 of which the switch element 46 is formed. The spring clip 80 contacts the stopper 58 of the whip 42, when the whip is extended. The other end of the spring 80 touches the pad 72.

Figure 3:
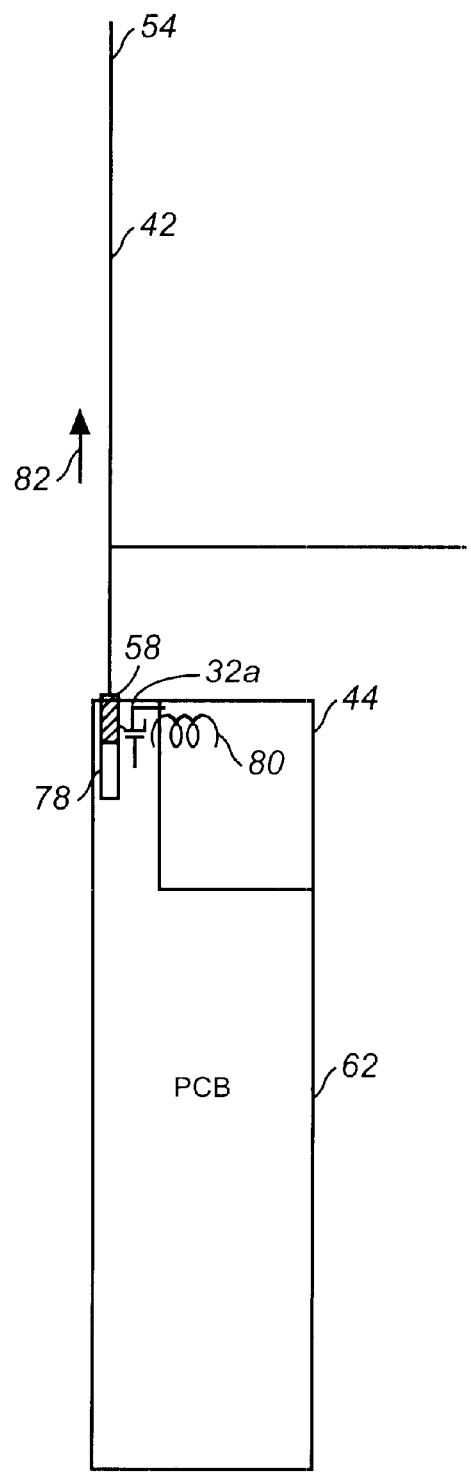
FIG. 3 illustrates a functional-block, plan view of the antenna assembly shown in FIG. 2, here in which the whip antenna transducer of the antenna assembly is positioned in an extracted position.

The antenna assembly 32 together with the printed circuit board 62 is again shown in FIG. 3. Here, the whip antenna transducer 42 is positioned in an extracted position, such as by exertion of a translation force in the direction of the arrow 82. The whip antenna transducer 42 is connected, by way of the RF input 66 to radio circuitry (not shown in FIG. 3) when the transducer 42 is positioned in the extracted position.

When translated into the extracted position, the spring bias force of the spring 80 pushes the plastic block 48, and the metal strip 52 mounted thereon, to interconnect the RF input port 66 with the pad 72 for connection of the whip antenna 56. When, conversely, the antenna transducer 42 is translated out of the extracted position, i.e., in the direction reverse to that of the arrow 82, the spring force generated by the spring 80 pushes the switch element 32 in a leftward (as-shown) direction, thereby to interconnect through the metal strip 52 the internal antenna transducer 44, connected to the pad 68, together with the radio circuitry, by way of the RF input port 66. Thereby, through translation of the whip antenna transducer, the radio circuitry is switchably connected to one or the other of the antenna transducers 42 or 44.

Figure 4:
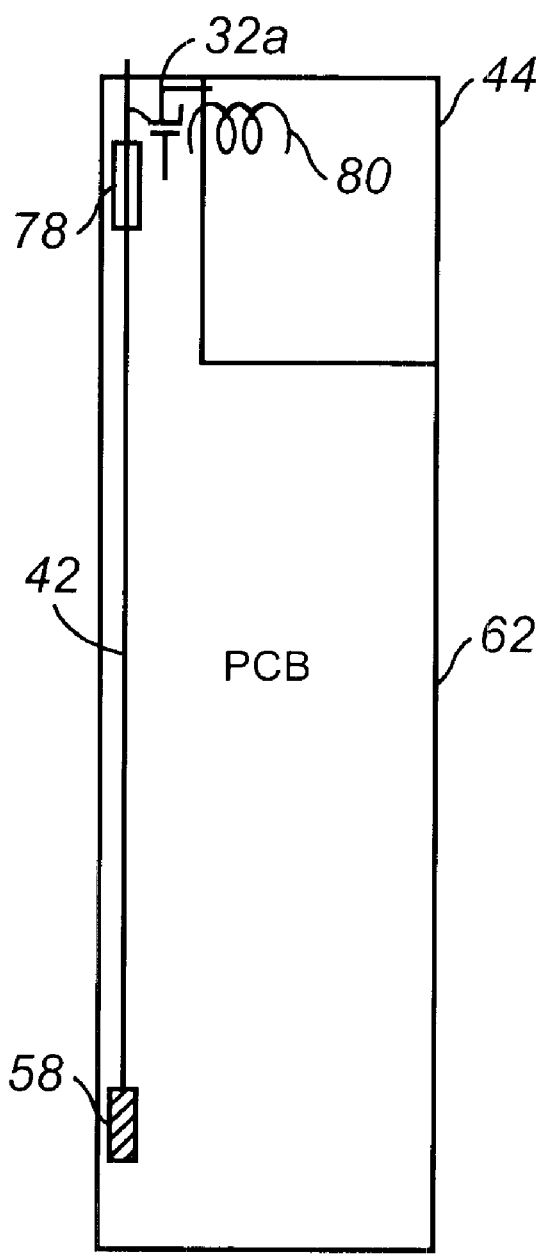
FIG. 4 illustrates a functional-block, plan view, similar to that shone in FIG. 3, but in which the whip antenna transducer of the mobile station is positioned in a retracted position.

FIG. 4 illustrates the positioning of the whip antenna transducer 42 in the retracted position whereat the switch element formed of the plastic block and the metal strip mounted thereon interconnects the RF input port 66 together with the pad 68, thereby to interconnect the antenna transducer 44 with the radio circuitry (not shown in the Figure).

Figure 5:
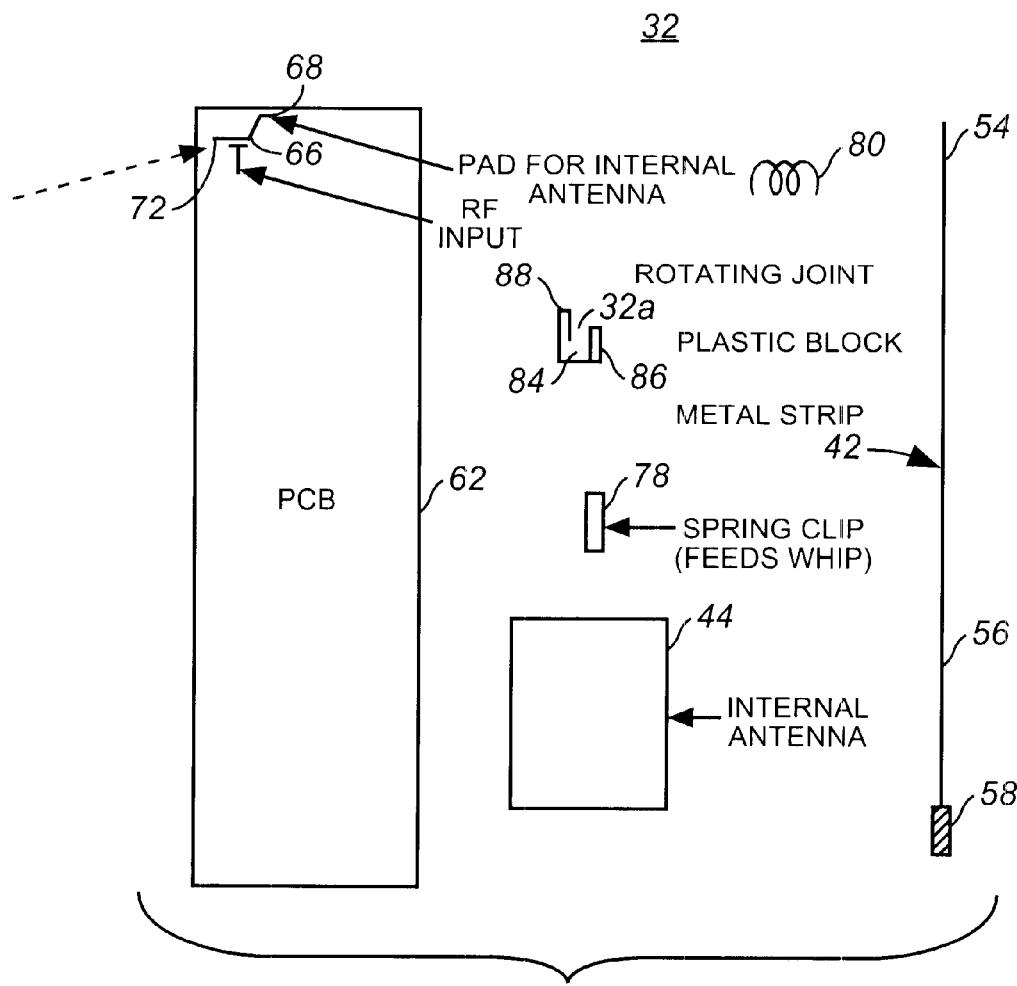
FIG. 5 illustrates an exploded, functional block diagram of an antenna assembly of another embodiment of the present invention.

FIG. 5 illustrates the antenna assembly 32 of another embodiment of the present invention. Structure common to the embodiment of the antenna assembly shown and described with respect to FIGS. 2–4 is again utilized. Description of operation of such structure is as described-above, and shall not be repeated herein.

In this embodiment, the switch element 46 is formed of a plastic block 84 upon which a metal strip 86 is mounted. The plastic block 84 includes an upwardly-projecting end portion 88 which is pivotally coupled to a pivot element (not shown) mounted at the printed circuit board. The spring 80 is positioned to cause rotation of the plastic block 84 about a pivot defined at the rotating joint of the upstanding end portion 88 of the plastic block. The spring 80 contacts the stopper 58 of the whip 42 when the whip is extended. The other end of the spring clip 78 touches the pad 72.

Figure 6:
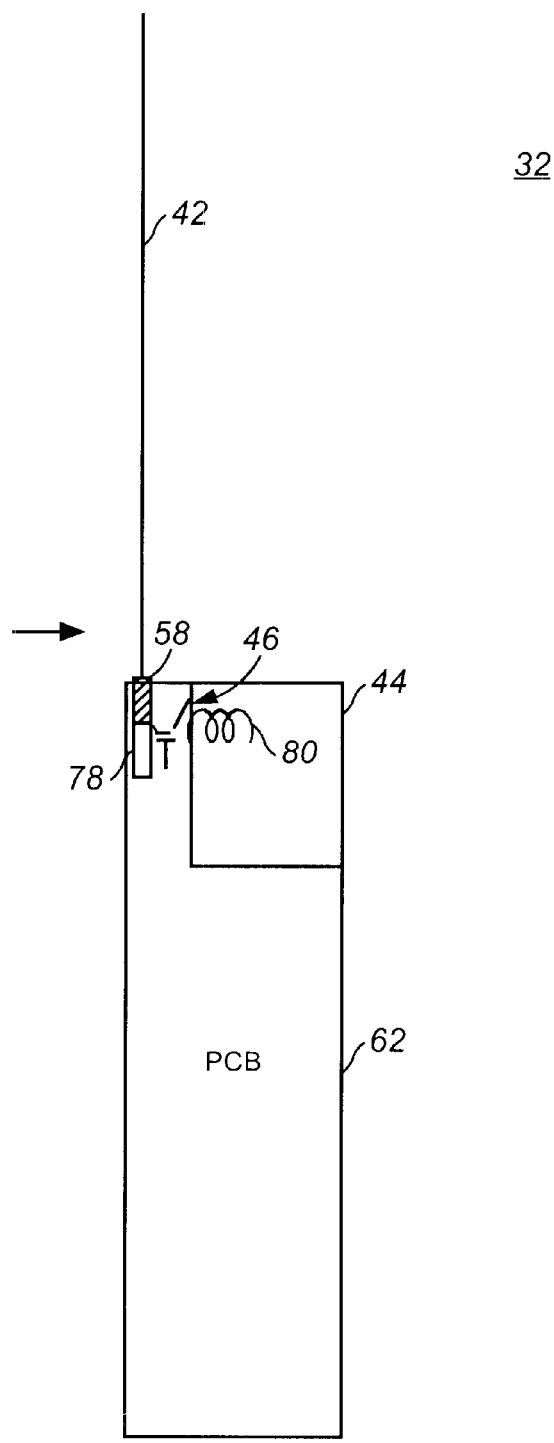
FIG. 6 illustrates a functional, plan view of the antenna assembly shown in FIG. 4 in which the whip antenna transducer of the antenna assembly is positioned in an extracted position.
Figure 7:
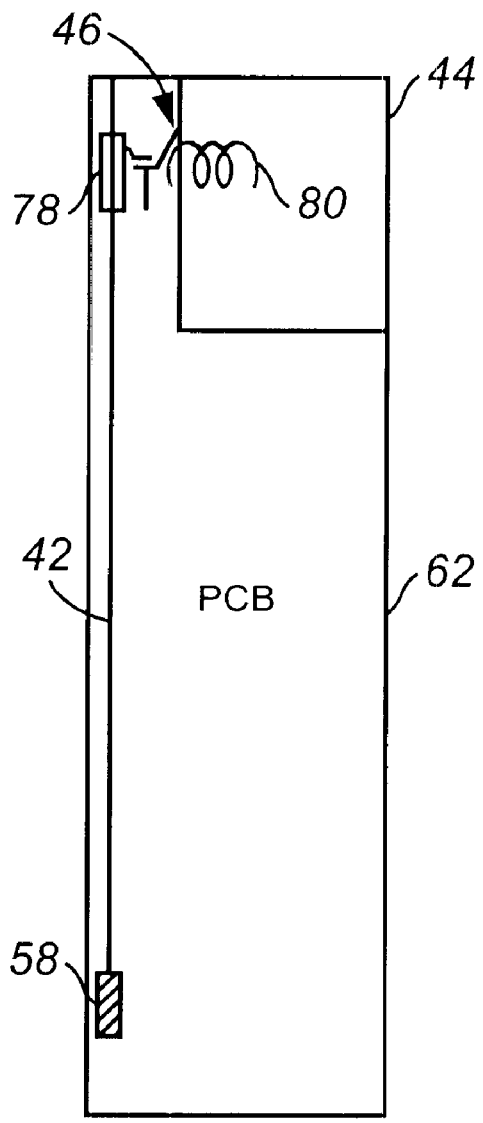
FIG. 7 illustrates a functional, plan view, similar to that shown in FIG. 6, but in which the whip antenna transducer is positioned in a retracted position.

FIG. 6 illustrates the antenna assembly in which the whip antenna transducer 42 is positioned in the extracted position, such as responsive to exertion of translation force in the direction indicated by the arrow 82. Positioning of the whip antenna transducer 42 in the extracted position causes positioning of the plastic block 84 to position the metal strip formed thereon to interconnect the whip antenna transducer, by way of the spring clip 80 and the pad 72 together with the port 66. When, conversely, and as shown in FIG. 6, the antenna transducer is translated out of the extracted position and, here, into the retracted position, the spring force exerted by the spring member 72 causes rotation of the plastic block 84 such that the metal strip 86 formed thereon interconnects the port 66 together with pad 68, thereby to interconnect the radio circuitry (not shown) together with the internal antenna 44.

Through operation of an embodiment of the present invention, thereby an antenna assembly is provided, together with an associated method, by which selectably to interconnect radio circuitry of a portable radio device, such as a mobile station, to a selected one of at least a pair of antenna transducers. The antenna assembly is compact, permitting its use in a radio housing of minimal dimensions.

The previous descriptions are of preferred examples for implementing the invention, and the scope of the invention should not necessarily be limited by this description. The scope of the present invention is defined by the following claims.

I claim:

1. An antenna assembly for a radio device having radio circuitry, said antenna assembly comprising:
   a first antenna transducer selectably connectable to the radio circuitry;
   a second antenna transducer also selectably connectable to the radio circuitry, said second antenna transducer translatable between a retracted position and an extracted position; and
   a switch element, comprising;
      a movable block member formed of non-conductive material;
      a contact strip formed of conductive material, wherein the contact strip is fixedly mounted on said block member;
      a spring member positioned to bias said block member such that said contact strip closes a connection between the first antenna transducer and said radio circuitry when said second antenna transducer is not in the extracted position.

2. The antenna assembly of claim 1 wherein the radio circuitry is housed in a housing and wherein said first antenna transducer is housed within the housing together with the radio circuitry.

3. The antenna assembly of claim 1 wherein said first antenna transducer comprises a PIFA (Planar Inverted F Antenna) transducer.

4. The antenna assembly of claim 1 wherein said first antenna transducer comprises a patch antenna.

5. The antenna assembly of claim 1 wherein the radio circuitry is housed in a housing, and wherein said second antenna transducer comprises an elongated shaft having a first end and a second end; wherein, when said second antenna transducer is translated into the extracted position, the second end thereof extends beyond the housing.

6. An antenna assembly for a radio device having radio circuitry, said antenna assembly comprising:
   a first antenna transducer selectably connectable to the radio circuitry;
   a second antenna transducer also selectably connectable to the radio circuitry, said second antenna transducer translatable between a retracted position and an extracted position; and
   a switch element, comprising;
      a movable block member formed of non-conductive material;
      a contact strip formed of conductive material, wherein the contact strip is fixedly mounted on said block member;
      a spring member positioned to bias said block member such that said contact strip closes a connection between the first antenna transducer and said radio circuitry when said second antenna transducer is not in the extracted position; and
   wherein the radio circuitry is housed in a housing, and wherein said second antenna transducer comprises an elongated shaft having first end and a second end; wherein when said second antenna transducer is translated into the extracted position, the second end thereof extends beyond the housing.

7. The antenna assembly of claim 6 wherein said second antenna transducer, when positioned at the extracted position causes the generation of counter-spring force sufficient to move said block so as to position the contact strip to connect the radio circuitry with said second antenna transducer.

8. The antenna assembly of claim 7 wherein the first end of said second antenna transducer comprises a metallic stopper, said metallic stopper positioned to prevent additional extractive translation of said second antenna transducer once said second antenna transducer is translated into the extracted position.

9. The antenna assembly of claim 8 wherein said metallic stopper contacts a portion of said contact strip when said second assembly transducer is positioned at the extracted position.

10. The antenna assembly of claim 6 wherein said block member is permitted lateral movement alternately to position said contact strip to connect the radio circuitry with said first antenna transducer and to connect the radio circuitry with said second antenna transducer.

11. The antenna assembly of claim 6 wherein said block member is permitted pivotal movement alternately to position said contact strip to connect the radio circuitry with said first antenna transducer and to connect the radio circuitry with said second antenna transducer.

12. The antenna assembly of claim 6 wherein the radio device comprises a radio transceiver operable to receive receive signals and to send send signals, wherein said first antenna transducer is operable, when connected to the radio circuitry, to transduce the receive signals and to transduce the send signals.

13. The antenna assembly of claim 12 wherein said second antenna transducer is operable, when connected to the radio circuitry, to transduce the receive signals and to transduce the send signals.

* * * * *